(12) United States Patent
Le et al.

(10) Patent No.: US 11,388,348 B2
(45) Date of Patent: Jul. 12, 2022

(54) SYSTEMS AND METHODS FOR DYNAMIC RANGE COMPRESSION IN MULTI-FRAME PROCESSING

(71) Applicant: Samsung Electronics Co., Ltd., Suwon-si (KR)

(72) Inventors: Long N. Le, Richardson, TX (US); Ruiwen Zhen, Allen, TX (US); John W. Glotzbach, Allen, TX (US); Hamid R. Sheikh, Allen, TX (US); Ibrahim Pekkucuksen, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/139,920

(22) Filed: Dec. 31, 2020

(65) Prior Publication Data
US 2022/0021802 A1    Jan. 20, 2022

Related U.S. Application Data

(60) Provisional application No. 63/054,187, filed on Jul. 20, 2020.

(51) Int. Cl.
*H04N 5/235* (2006.01)
*H04N 5/355* (2011.01)
*G06T 3/40* (2006.01)

(52) U.S. Cl.
CPC ......... *H04N 5/2355* (2013.01); *G06T 3/4015* (2013.01); *H04N 5/35563* (2013.01); *G06T 2200/32* (2013.01)

(58) Field of Classification Search
CPC ............. H04N 5/2355; H04N 5/35563; G06T 3/4015; G06T 2200/32
See application file for complete search history.

(56) References Cited

U.S. PATENT DOCUMENTS

| 8,786,625 | B2 * | 7/2014 | Cote | ............. H04N 9/735 345/589 |
| 9,330,630 | B2 * | 5/2016 | Kerofsky | ............. G09G 3/3406 |

(Continued)

FOREIGN PATENT DOCUMENTS

| KR | 10-2015-0108774 A | 9/2015 |
| KR | 10-2016-0150650 A | 12/2016 |
| KR | 10-2018-0100124 A | 9/2018 |

OTHER PUBLICATIONS

Liba, "Handheld Mobile Photography in Very Low Light," ACM Transactions on Graphics, vol. 38, No. 6, Article 164, Oct. 2019, 22 pages.

(Continued)

*Primary Examiner* — Shahbaz Nazrul

(57) ABSTRACT

A method includes obtaining, using at least one processor of an electronic device, a high dynamic range (HDR) input Bayer image. The method also includes generating, using the at least one processor of the electronic device, a plurality of synthesized images at different exposure levels based on the input Bayer image. The method further includes fusing, using the at least one processor of the electronic device, the synthesized images to generate a fused image. The method also includes generating, using the at least one processor of the electronic device, a gain map based on the fused image. In addition, the method includes applying, using the at least one processor of the electronic device, a gain based on the gain map to the input Bayer image.

20 Claims, 12 Drawing Sheets

(56) References Cited

U.S. PATENT DOCUMENTS

| | | | |
|---|---|---|---|
| 9,392,236 B2 | 7/2016 | Artyomov et al. | |
| 9,654,700 B2 | 5/2017 | Kovtun et al. | |
| 9,832,388 B2 | 11/2017 | Motta et al. | |
| 10,079,981 B2 | 9/2018 | Ji | |
| 2010/0271512 A1* | 10/2010 | Garten | G09G 5/14 |
| | | | 348/239 |
| 2011/0188744 A1 | 8/2011 | Sun | |
| 2013/0322752 A1* | 12/2013 | Lim | G06T 5/20 |
| | | | 382/167 |
| 2014/0152686 A1* | 6/2014 | Narasimha | H04N 5/2355 |
| | | | 345/589 |
| 2015/0023594 A1* | 1/2015 | Zhang | H04N 3/155 |
| | | | 382/167 |
| 2015/0269714 A1 | 9/2015 | Boitard et al. | |
| 2016/0093029 A1* | 3/2016 | Micovic | G06T 7/337 |
| | | | 348/229.1 |
| 2017/0103729 A1* | 4/2017 | Huang | H04N 9/68 |
| 2018/0232867 A1 | 8/2018 | Park et al. | |
| 2018/0322614 A1 | 11/2018 | Petrova et al. | |
| 2018/0332210 A1 | 11/2018 | Kamiya | |
| 2019/0043177 A1* | 2/2019 | Nishimura | G06T 5/40 |
| 2019/0130542 A1* | 5/2019 | Tichelaar | G06T 5/007 |
| 2020/0219236 A1 | 7/2020 | Olivier et al. | |

OTHER PUBLICATIONS

International Search Report and Written Opinion of the International Searching Authority dated Oct. 5, 2021 in connection with International Patent Application No. PCT/KR2021/008720, 9 pages.

* cited by examiner

SYSTEMS AND METHODS FOR DYNAMIC RANGE COMPRESSION IN MULTI-FRAME PROCESSING

CROSS-REFERENCE TO RELATED APPLICATION AND PRIORITY CLAIM

This application claims priority under 35 U.S.C. § 119(e) to U.S. Provisional Patent Application No. 63/054,187 filed on Jul. 20, 2020, which is hereby incorporated by reference in its entirety.

TECHNICAL FIELD

This disclosure relates generally to image processing systems. More specifically, this disclosure relates to systems and methods for dynamic range compression in multi-frame processing.

BACKGROUND

Many mobile electronic devices, such as smart phones and tablet computers, include cameras that can be used to capture still and video images. While convenient, cameras on mobile electronic devices typically suffer from a number of shortcomings, including poor performance in low-light situations. Producing high-quality nighttime images or other images of dark scenes may require multi-frame processing in the Bayer domain.

SUMMARY

This disclosure provides systems and methods for dynamic range compression in multi-frame processing.

In a first embodiment, a method includes obtaining, using at least one processor of an electronic device, a high dynamic range (HDR) input Bayer image. The method also includes generating, using the at least one processor of the electronic device, a plurality of synthesized images at different exposure levels based on the input Bayer image. The method further includes fusing, using the at least one processor of the electronic device, the synthesized images to generate a fused image. The method also includes generating, using the at least one processor of the electronic device, a gain map based on the fused image. In addition, the method includes applying, using the at least one processor of the electronic device, a gain based on the gain map to the input Bayer image.

In a second embodiment, an electronic device includes at least one processing device configured to obtain an HDR input Bayer image. The at least one processing device is also configured to generate a plurality of synthesized images at different exposure levels based on the input Bayer image. The at least one processing device is further configured to fuse the synthesized images to generate a fused image. The at least one processing device is also configured to generate a gain map based on the fused image. In addition, the at least one processing device is configured to apply a gain based on the gain map to the input Bayer image.

In a third embodiment, a non-transitory machine-readable medium contains instructions that when executed cause at least one processor of an electronic device to obtain an HDR input Bayer image. The medium also contains instructions that when executed cause the at least one processor to generate a plurality of synthesized images at different exposure levels based on the input Bayer image. The medium further contains instructions that when executed cause the at least one processor to fuse the synthesized images to generate a fused image. The medium also contains instructions that when executed cause the at least one processor to generate a gain map based on the fused image. In addition, the medium contains instructions that when executed cause the at least one processor to apply a gain based on the gain map to the input Bayer image.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
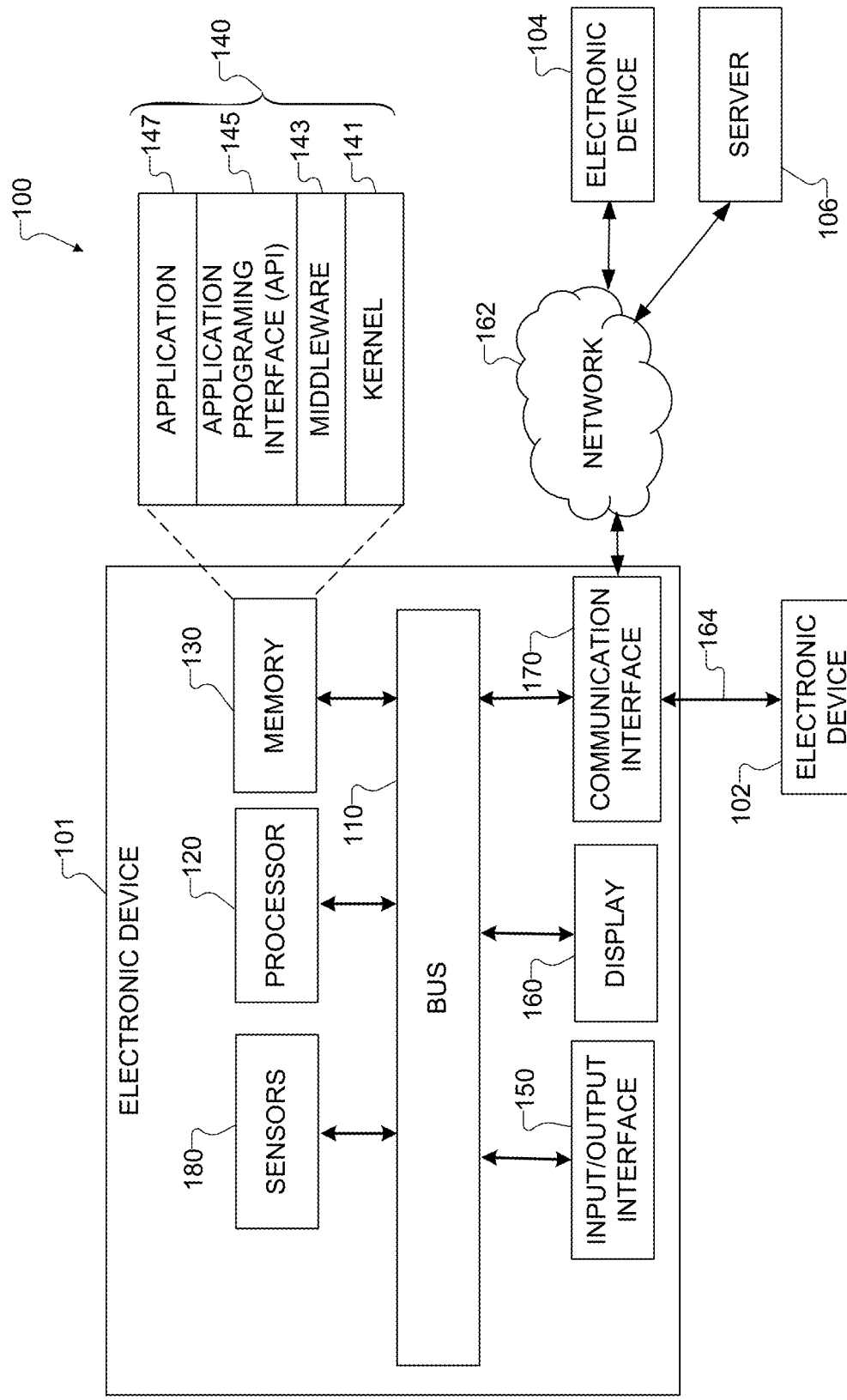
FIG. 1 illustrates an example network configuration including an electronic device according to this disclosure.

FIGS. 1 through 14, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, many mobile electronic devices, such as smart phones and tablet computers, include cameras that can be used to capture still and video images. While convenient, cameras on mobile electronic devices typically suffer from a number of shortcomings, including poor performance in low-light situations. Producing high-quality nighttime images or other images of dark scenes may require multi-frame processing in the Bayer domain. Unfortunately, the result of combining multiple image frames at different exposure levels is a high-dynamic range (HDR) image that needs to be compressed back to a displayable range.

This disclosure provides systems and methods for dynamic range compression in multi-frame processing. As described in more detail below, a Bayer/linear mapping system can be used to produce high-quality images of scenes. The systems and methods disclosed here may generate multiple nonlinear Luma, YUV, or other images, and tone mapping operations can be performed by manipulating the images. Once processing is completed, a resulting image may be converted back into the Bayer/linear domain. The resulting output is a displayable-range Bayer/linear image with minimal contrast loss due to compression.

Depending on the implementation, a gain map can be generated to guide the compression in the original Bayer domain based on a fused image. For example, the gain map may determine a pixel-wise compression level that can be applied to the original Bayer image to yield a toned output Bayer image. When Luma images are used, a family of gamma-S curves may be applied to the Luma images, offering control of a compression-contrast trade-off. One possibility here involves the use of the half-scale Luma domain for guidance on compression, which may be used to provide an artifact-free toned Bayer output. When LUV images are used, an image signal processing (ISP) pipeline may be used to convert Bayer images into multiple YUV images of different exposures. A tone-mapped Bayer image is not sensitive to the parameter selection of the ISP pipeline, and the scales used to scale a Bayer image to different exposure levels may be adaptive to scene statistics. For instance, the highest scale may be increased if the overall scene brightness level is low, and the lowest scale may be forbidden from exceeding a threshold if the overall scene brightness level is high. Color-awareness may be used to help preserve color saturation in gain map generation, and bilinear interpolation may be applied in a demosaic operation to help avoid staircase artifacts in the gain map generation. The gain map applied on a Bayer image may be determined as the weighted average of three color planes to avoid chroma noise amplification.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described in more detail below, the processor 120 can perform dynamic range compression in multi-frame processing. For example, the processor 120 can obtain an HDR input Bayer image, generate a plurality of synthesized images at different exposure levels based on the input Bayer image, fuse the synthesized images to generate a fused image, generate a gain map based on the fused image, and apply a gain based on the gain map to the input Bayer image.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for image capture and image processing as discussed below. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images or videos.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments, the server 106 can perform dynamic range compression in multi-frame processing. For example, the server 106 can obtain an HDR input Bayer image, generate a plurality of synthesized images at different exposure levels based on the input Bayer image, fuse the synthesized images to generate a fused image, generate a gain map based on the fused image, and apply a gain based on the gain map to the input Bayer image.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
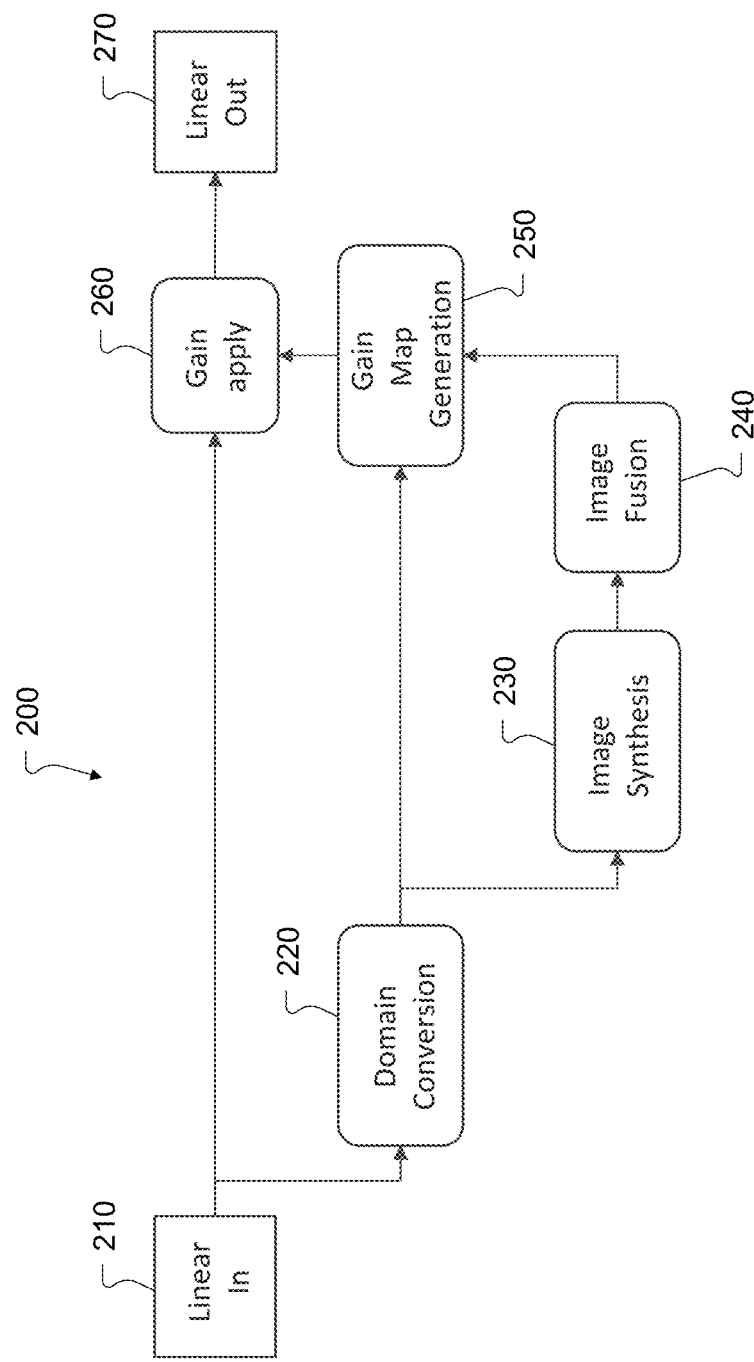
FIG. 2 illustrates an example process for dynamic range compression in multi-frame processing according to this disclosure.

FIG. 2 illustrates an example process 200 for dynamic range compression in multi-frame processing according to this disclosure. For ease of explanation, the process 200 is described as being implemented using the electronic device 101 shown in FIG. 1. However, the process 200 could be implemented in any other suitable electronic device and in any suitable system, such as by the server 106.

As shown in FIG. 2, the process 200 receives, generates, or otherwise obtains an input of a linear image 210. The input linear image 210 may be a frame, single image, multiple images, or a video stream. In the examples that follow, the linear image 210 is assumed to be a 16-bit Bayer image, although other types of input linear images 210 may be received and processed. The process 200 includes a domain conversion operation 220, which generally operates to convert the input Bayer image 210 into another image domain for further processing. The other image domain may be, for example, the Luma domain, the YUV domain, or any other suitable image domain. The domain conversion operation 220 may support any suitable technique for converting image data between domains.

An image synthesis operation 230 generally operates to produce multiple synthesized images at different exposure levels based on the input Bayer image 210 (or, more specifically, the converted version of the input Bayer image 210). The image synthesis operation 230 may use any suitable technique to synthesize images at different exposure levels based on an input Bayer image. For example, in some embodiments, the image synthesis operation 230 may use one or more lookup tables as described below to generate the synthesized images. An image fusion operation 240 generally operates to receive the synthesized images and to fuse the synthesized images into a fused or blended image. The image fusion operation 240 may use any suitable technique to fuse synthesized images. For instance, in some embodiments, the image fusion operation 240 may use a pyramid blending technique to fuse the synthesized images.

A gain map operation 250 generally operates to receive the converted version of the input Bayer image 210 and the fused image in order to generate a gain map. The gain map operation 250 may use any suitable technique to generate a gain map. For example, in some embodiments, the gain map operation 250 may transform the fused image into a first RGB image, convert the input Bayer image into a second RGB image using a demosaic function to compute red, green, and blue plane gain maps, and generate the gain map based on the first RGB image and the red, green, and blue plane gain maps. A gain apply operation 260 generally operates to apply gains as represented within the gain map to the input Bayer image 210 in order to generate an output Bayer image 270. As part of this process, the gain apply operation 260 can reduce the number of bits representing the image data in the output Bayer image 270. For instance, the gain apply operation 260 may convert 16-bit values in the input Bayer image 210 into 12-bit values in the output Bayer image 270.

Note that the functions and other operations described above with reference to FIG. 2 can be implemented in an electronic device 101, 102, 104, server 106, or other device in any suitable manner. For example, in some embodiments, the operations described above can be implemented or supported using one or more software applications or other software instructions that are executed by at least one processor 120 of a device. In other embodiments, at least some of the operations described above can be implemented or supported using dedicated hardware components. In general, the operations described above can be performed using any suitable hardware or any suitable combination of hardware and software/firmware instructions.

Although FIG. 2 illustrates one example of a process 200 for dynamic range compression in multi-frame processing, various changes may be made to FIG. 2. For example, each operation 220, 230, 240, 250, 260 may occur any number of times as needed or desired in order to process input images and generate output images.

Figure 3:
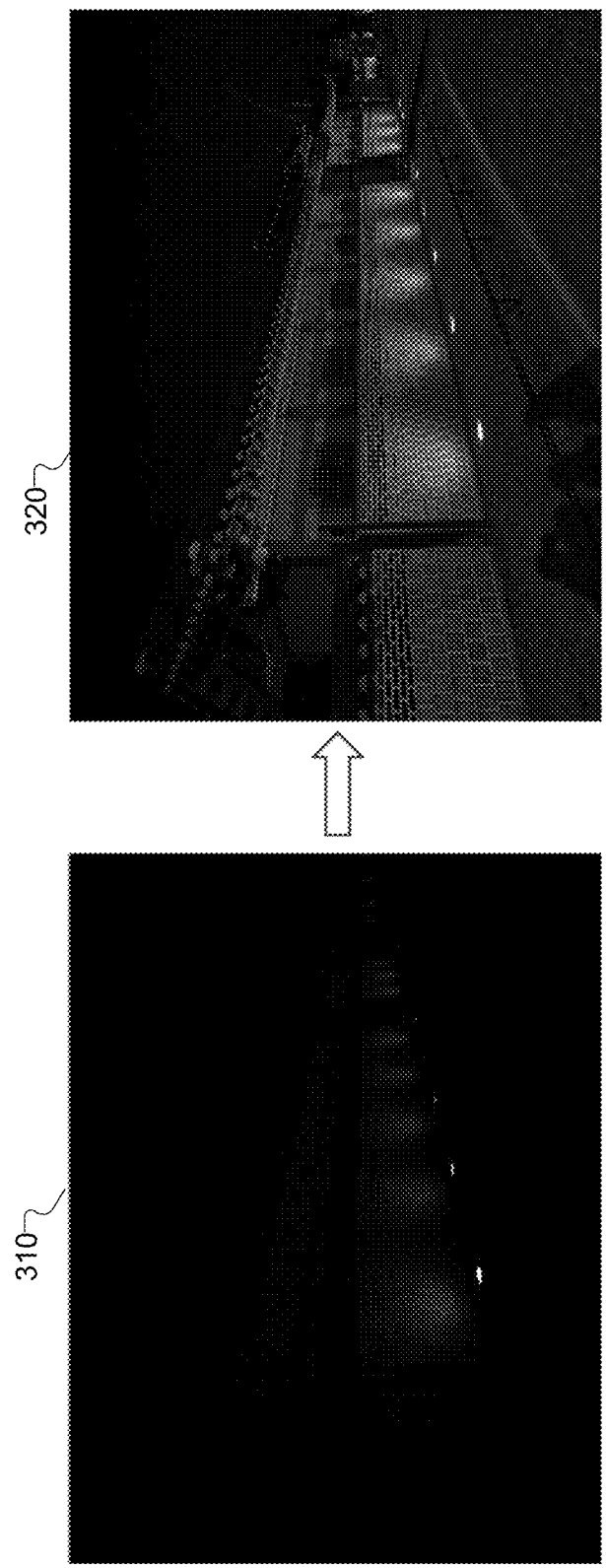
FIG. 3 illustrates an example input image and an example output image in accordance with this disclosure.

FIG. 3 illustrates an example input image 310 and an example output image 320 in accordance with this disclosure. The input image 310 may represent the input Bayer image 210 of FIG. 2, and the output image 320 may represent the output Bayer image 270 of FIG. 2. As can be seen here, the process 200 generally operates to provide dynamic range compression of the input image 310 in order to produce a more pleasing output image 320. Among other things, the image contents of the output image 320 are much clearer and easier to see compared to the input image 310. As noted above, part of the process 200 may include converting 16-bit values or other values of the input image 310 into 12-bit values or other values of the output image 320.

Although FIG. 3 illustrates one example of an input image 310 and one example of an output image 320, various changes may be made to FIG. 3. For example, the images 310 and 320 shown here are merely meant to illustrate one example of the type of result that might be obtained using the process 200. Of course, image contents can vary widely based on the scenes, so the results obtained using the process 200 can also vary widely.

Figure 4:
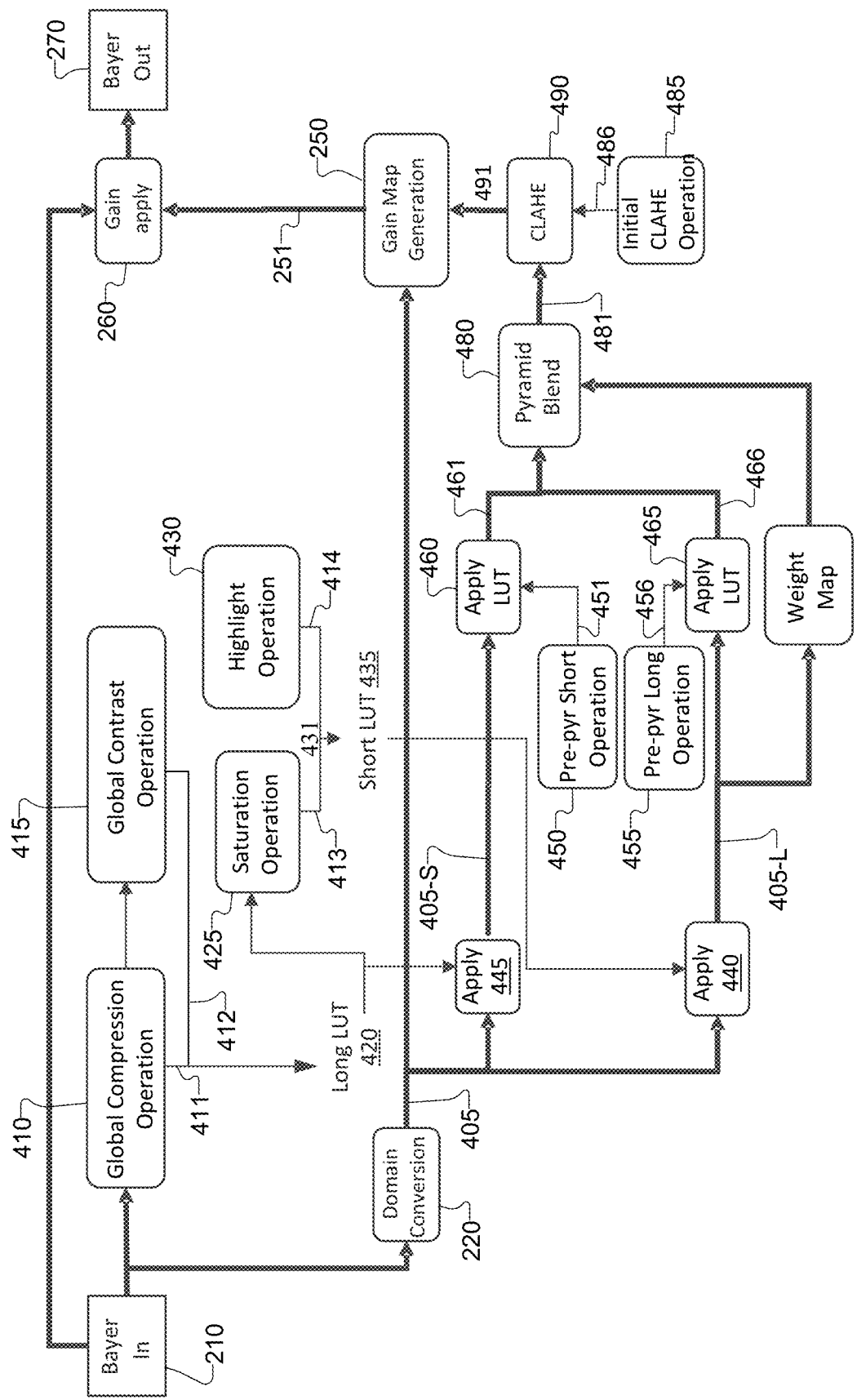
FIG. 4 illustrates an example Luma-based process for dynamic range compression in accordance with this disclosure.

FIG. 4 illustrates an example Luma-based process 400 for dynamic range compression in accordance with this disclosure. More specifically, FIG. 4 illustrates how the process 200 may be implemented when processing images in the Luma domain. For ease of explanation, the process 400 is described as being implemented using the electronic device 101 shown in FIG. 1. However, the process 400 could be implemented in any other suitable electronic device and in any suitable system, such as by the server 106.

As shown in FIG. 4, the input Bayer image 210 is provided to the domain conversion operation 220, which converts the input Bayer image 210 into Luma image 405.

In some embodiments, to convert an image from the Bayer domain (W×H) to the Luma domain (W/2×H/2), the following fixed conversion may be applied, where R is based on red pixels, G is based on green pixels, and B is based on blue pixels in the image 210:

Luma Domain=0.2126×R+0.7152×(aggregated G)/2+ 0.0722×B     (1)

After the input Bayer image 210 is converted into the Luma domain, multiple synthesized images may be generated, where at least some of the synthesized images have different exposure levels. For example, first and second synthesized images may be generated, where the first image has a longer exposure and is therefore brighter and the second image has a shorter exposure and is therefore darker (at least relative to the first image). In this example, to generate the synthesized images, a long lookup table (LUT) 420 and a short LUT 435 may be dynamically created and applied to Luma image 405 through apply operations 440 and 445, respectively. The output of the apply operation 440 is a long Luma image 405-L, and the output of the apply operation 445 is a short Luma image 405-S.

Once the Luma images 405-L and 405-S are generated, the electronic device 101 may perform a series of operations to support fusing, such as pyramid blending, of the Luma images 405-L and 405-S. An example of the pyramid blending process will be explained in more detail below. The output of the pyramid blending process may be a single blended image 481, which may be said to represent a fused image. At this point, any number of post-processing operations may be performed on the blended image 481. For instance, the electronic device 101 may perform a contrast limited adaptive histogram equalization (CLAHE) operation 490 to improve the contrast of the blended image 481 and generate a processed blended image 491. Other and/or additional image processing techniques may also be applied to the blended image 481 or 491. The gain map operation 250 may then generate a gain map 251, such as by dividing the blended image 481 or 491 by the Luma image 405. The gain operation 260 then applies gains based on the gain map 251 to the input Bayer image 210.

The following now describes example operations that may be performed by the electronic device 101 to create the long LUT 420 and the short LUT 435 of FIG. 4. Note, however, that other suitable techniques may be used here to generate lookup tables. In this example, a global compression operation 410 compresses the input Bayer image 210 (such as by reducing 16-bit values to 12-bit values) by dynamically generating a global compression LUT 411 based on the input Bayer image 210. For example, the global compression operation 410 may calculate the global compression LUT 411 using the Equation (2) below, where the listed variables will be explained in more detail below.

$$D(I) = (D_{max} - D_{min}) * \frac{\log(I + \tau) - \log(I_{min} + \tau)}{\log(I_{max} + \tau) - \log(I_{min} + \tau)} + D_{min} \quad (2)$$

To solve for τ, the following equation may be used:

$$k = \frac{\log(I_{ave} + \tau) - \log(I_{min} + \tau)}{\log(I_{max} + \tau) - \log(I_{min} + \tau)} \quad (3)$$

where k is computed as:

$$k = A \times B^{(2\ \log\ I_{ave} - \log\ I_{min} - \log\ I_{max})/(\log\ I_{max} - \log\ I_{min})} \quad (4)$$

Figure 5:
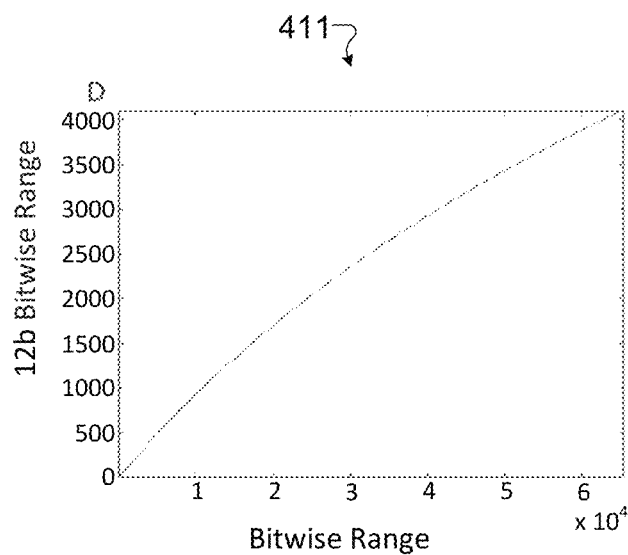
FIG. 5 illustrates an example lookup table generated by a compression operation in accordance with this disclosure.

FIG. 5 illustrates an example lookup table 411 generated by a compression operation in accordance with this disclosure. More specifically, the lookup table 411 in FIG. 5 may be generated by the global compression operation 410 of FIG. 4. As shown in FIG. 5, each 16-bit pixel value in the input Bayer image 210 may be mapped to a corresponding 12-bit pixel value.

With reference to Equations (2), (3), and (4) above, $D_{min}$ and $D_{max}$ may be set based on the bitwise range. In the example global compression LUT 411 of FIG. 5, the desired output is a 12-bit pixel value, so $D_{min}$ is 0 and $D_{max}$ is 4,096. Similarly, $I_{min}$ and $I_{max}$ represent the minimum and maximum values of the bitwise range of the input Bayer image 210. Also, A and B of Equation (4) represent a variety of parameters that may be pre-configured, chosen by a user, adjusted, dynamically determined, or otherwise determined in any suitable manner. For example, an electronic device 101 may determine a parameter or combination of parameters to apply or adjust based on the input. Example parameters here may include or be related to brightness, contrast, a certain focus area, or any other suitable image characteristic(s).

Due to the compression applied to the input Bayer image 210 in the compression operation 410, there may be a loss in contrast in the resulting compressed image. Accordingly, a global contrast operation 415 may receive or otherwise obtain the compressed image generated by the compression operation 410 and increase the contrast of the compressed image. In some embodiments, the contrast operation 415 may be a stretching operation, which could be implemented using the recursive binary cut implementation of the Histogram Adjustment based Linear to Equalized Quantizer (HALEQ). The result of the contrast operation 415 is a global contrast LUT 412.

The long LUT 420 may then be generated using the global compression LUT 411 and the global contrast LUT 412. In some embodiments, the long LUT 420 may be formed as a concatenation of the global compression LUT 411 and the global contrast LUT 412. This can be expressed as:

Long LUT(x)=Global contrast LUT(Global compression LUT(x))     (5)

Figure 6:
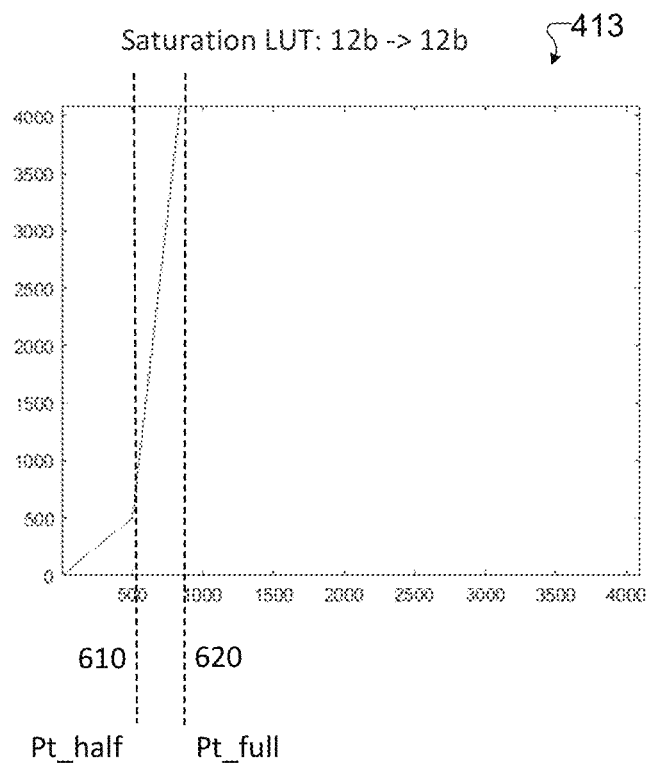
FIG. 6 illustrates an example lookup table generated by a saturation operation in accordance with this disclosure.

In some embodiments, a compression operation (such as the operation 410) may cause some or all white areas of a short-exposure image to have a grayish color due to over-compression of those areas. In FIG. 4, a short LUT 435 may be generated and used to bring gray levels back to the saturation level. The short LUT 435 may be generated by performing a saturation operation 425 and a highlight operation 430. In the saturation operation 425, the long LUT 420 is analyzed to create a saturation LUT 413. FIG. 6 illustrates an example lookup table 413 generated by a saturation operation in accordance with this disclosure. More specifically, the lookup table 413 in FIG. 6 may be generated by the saturation operation 425 of FIG. 4. As shown in FIG. 6, both the inputs and the outputs are 12-bit values. In some embodiments, the saturation LUT 413 may be generated using the following equations:

Pt_half=Long LUT($D_{max}$/2)     (6)

Pt_full=Long LUT($D_{max}$)     (7)

Figure 7:
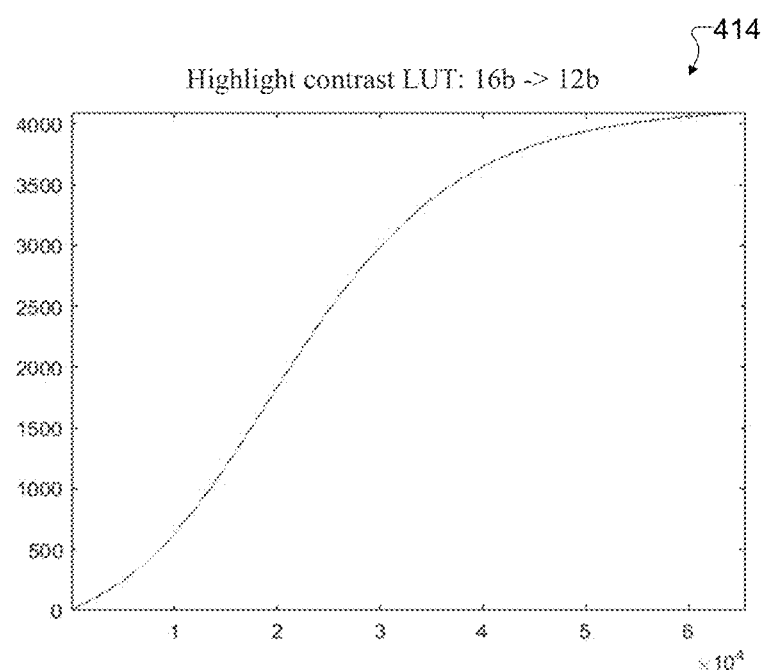
FIG. 7 illustrates an example lookup table generated by a highlight operation in accordance with this disclosure.

In the highlight operation 430, the input Bayer image 210 is stretched using an S-shaped curve. The resulting curve is used as a highlight contrast LUT 414. FIG. 7 illustrates an example lookup table 414 generated by a highlight operation in accordance with this disclosure. More specifically, the lookup table 414 in FIG. 7 may be generated by the highlight operation 430 of FIG. 4. As shown in FIG. 7, the highlight contrast LUT 414 may have an S-shaped curve. In some embodiments, the highlight contrast LUT 414 may be generated using the following operation, which will be explained in more detail below:

$$\text{Gamma-S curve LUT}(x;1.6,8.5,8.5) \qquad (8)$$

After the saturation LUT 413 and the highlight contrast LUT 414 have been generated, a weighted blending operation 431 can be performed to generate the short LUT 435. In some embodiments, the blending operation 431 may be expressed as:

$$\text{Short LUT}(x) = \text{Saturation LUT}(\text{Long LUT}(\text{Highlight contrast LUT}(x))) \qquad (9)$$

As noted above, the apply operations 440 and 445 can be performed using the long LUT 420 and the short LUT 435 to generate the short Luma image 405-S and the long Luma image 405-L.

In order to support pyramid blending of the short Luma image 405-S and the long Luma image 405-L, a pre-pyramid short operation 450 is used to generate a pre-pyramid short LUT 451, and a pre-pyramid long operation 455 is used to generate a pre-pyramid long LUT 456. In some embodiments, the pre-pyramid short LUT 451 can be generated using an equation such as:

$$\text{Gamma-S curve LUT}(x;1.2,9.5,-9.0) \qquad (10)$$

Also, in some embodiments, the pre-pyramid long LUT 456 can be generated using an equation such as:

$$\text{Gamma-S curve LUT}(x;1.1,4.5,1.0) \qquad (11)$$

Apply LUT operations 460 and 465 respectively apply the pre-pyramid short LUT 451 to the short Luma image 405-S and the pre-pyramid long LUT 456 to the long Luma image 405-L. This results in the generation of a pre-pyramid short image 461 and a pre-pyramid long image 466. A pyramid blending operation 480 then blends the pre-pyramid short image 461 and the pre-pyramid long image 466 to produce the blended image 481.

Figure 8:
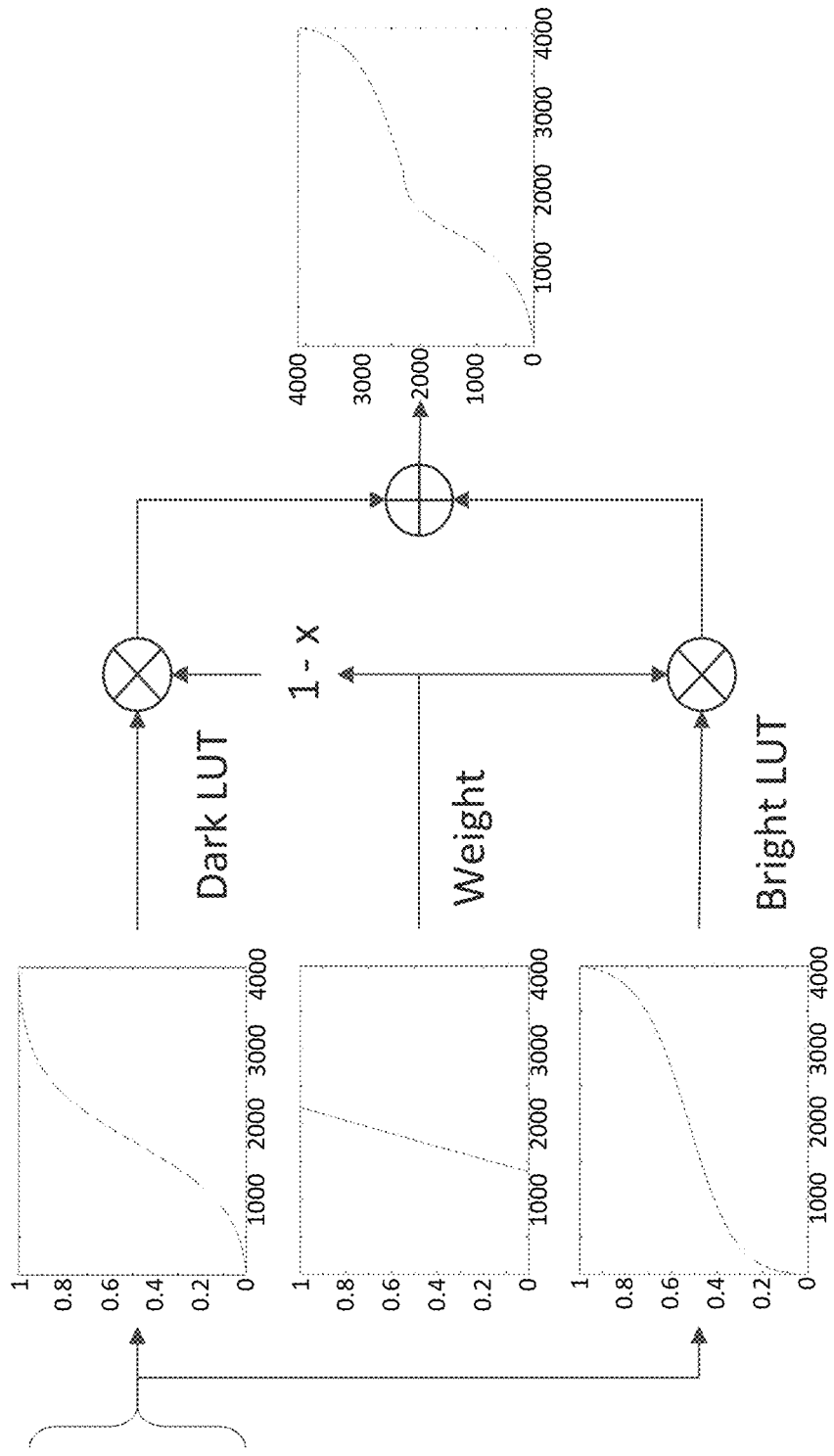
FIG. 8 illustrates an example Gamma-S curve operation in accordance with this disclosure.

FIG. 8 illustrates an example Gamma-S curve operation in accordance with this disclosure. A Gamma-S curve is generated by mixing together multiple sigmoid-gamma combination curves, each of which is generated by the following equations:

$$\frac{\left(\frac{1}{1+e^{-(\hat{x}s_i - s_i/2)}} - m\right)}{M-m}, \; s_i \geq 0 \qquad (12)$$

$$\frac{\text{Log}\left(\frac{1}{\hat{x}(m-M)+M} - 1\right)}{s_i} + \frac{1}{2}, \; s_i < 0 \qquad (13)$$

where:

$i = \text{dark, bright}$ $$m = \frac{1}{1 + \exp\left(\frac{s_i}{2}\right)}$$

-continued $$M = \frac{1}{1 + \exp\left(\frac{-s_i}{2}\right)}$$

$$\hat{x} = x^{\frac{1}{inv\_gamma}}$$

and $s_i$ is the parameter that controls the shape of the curve i. In some embodiments, each curve i can be controlled to focus on the dark and bright area of an image, respectively. The Gamma-S curve is therefore parameterized by inv_gamma and the s-parameters for the dark and bright areas:

$$\text{Gamma-S curve LUT}(x;inv\_gamma,s\_dark,s\_bright) \qquad (14)$$

Returning to FIG. 4, an initial CLAHE operation 485 may be used to generate an initial CLAHE LUT 486. For example, the initial CLAHE operation 485 may generate the initial CLAHE LUT 486 using an equation such as:

$$\text{Gamma-S curve LUT}(x;1.2,4.5,1.4)^{1.2} \qquad (15)$$

As noted above, the contrast limited adaptive histogram equalization operation 490 may be performed to improve the contrast of the blended image 481. Here, the CLAHE operation 490 obtains the blended image 481, applies the initial CLAHE LUT 486 to the blended image 481, and generates the image 491.

Note that the functions and other operations described above with reference to FIGS. 4 through 8 can be implemented in an electronic device 101, 102, 104, server 106, or other device in any suitable manner. For example, in some embodiments, the operations described above can be implemented or supported using one or more software applications or other software instructions that are executed by at least one processor 120 of a device. In other embodiments, at least some of the operations described above can be implemented or supported using dedicated hardware components. In general, the operations described above can be performed using any suitable hardware or any suitable combination of hardware and software/firmware instructions.

Although FIGS. 4 through 8 illustrate one example of a Luma-based process 400 for dynamic range compression and related details, various changes may be made to FIGS. 4 through 8. For example, each operation in FIG. 4 may occur any number of times as needed or desired in order to process input images and generate output images. Also, it may be possible to generate and fuse more than two synthetic images. In addition, the graphs shown in FIGS. 5 through 8 are for illustration only and can vary widely based on the image data being processed.

Note that in some cases, a single digital image captured by a mobile device may be insufficient to provide scene details in an HDR image. One approach to render an HDR image is to merge multiple different-exposed low dynamic range (LDR) images in a linear domain (Bayer domain). The fused Bayer image records the full dynamic range of the scene using high bit depth. In order to display the fused Bayer image on an LDR device, tone mapping techniques may be used to compress the fused Bayer image from high bit depth to a standard/displayable bit depth. However, many global or local tone mapping approaches directly applied in the Bayer domain are not adaptive to scene contents and may lead to various visual artifacts, such as flat effects, dark halos, and inconsistencies. Some embodiments of this disclosure therefore support a Bayer tone mapping system that may generate multiple nonlinear YUV images based on a fused Bayer image, perform tone mapping by manipulating the YUV images, and convert the YUV images to a compressed Bayer image. The process of converting the Bayer image to the YUV images may not be sensitive to parameter selections. Accordingly, the approaches disclosed here may be generalized to large numbers of datasets without specific metadata.

Figure 9:
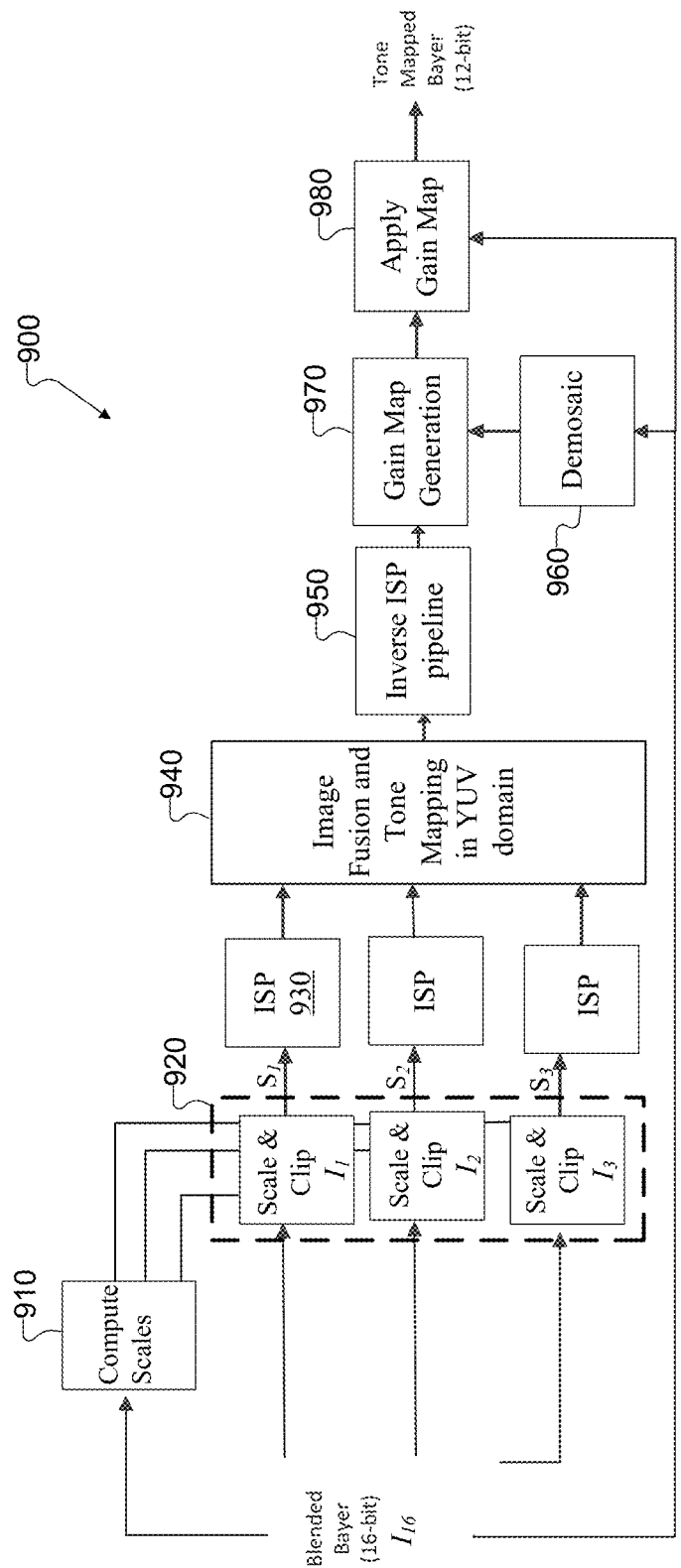
FIG. 9 illustrates an example YUV-based process for dynamic range compression in accordance with this disclosure.

FIG. 9 illustrates an example YUV-based process 900 for dynamic range compression in accordance with this disclosure. For ease of explanation, the process 900 is described as being implemented using the electronic device 101 shown in FIG. 1. However, the process 900 could be implemented in any other suitable electronic device and in any suitable system, such as by the server 106.

In general, a linear input image (such as an input Bayer image 210) may be used to generate synthesized images, such as in the manner described above with reference to FIG. 4. The synthesized images may be converted into the YUV domain and fused, and the fused image may be converted back into the original linear domain as a linear image for use in computing a gain map. Gains may then be applied to the original linear input image based on the gain map.

As shown in FIG. 9, the electronic device 101 may receive or otherwise obtain an input Bayer image $I_{16}$ and perform a scaling computation operation 910. The scaling computation operation 910 generally operates to identify the scales to be used to scale the input Bayer image to different exposure levels, such as based on scene statistics. For instance, the highest scale may be increased if the overall scene brightness level is low, and the lowest scale may be forbidden from exceeding a threshold if the overall scene brightness level is high.

The input Bayer image $I_{16}$ is scaled and clipped by one or more operations 920 using the identified scales to simulate different-exposed image data. The operations 920 can also reduce the size of the values of the input Bayer image, such as by reducing 16-bit values to 12-bit values. In the example of FIG. 9, the operations 920 generate three different-exposed Bayer images, such as a short-exposed image $I_1$ (scale $S_1$), a medium-exposed image $I_2$ (scale $S_2$), and a long-exposed image $I_3$ (scale $S_3$). In some embodiments, the following equation may be used to generate the images:

$$I_i = \min(I_{16} * S_i, 2^{12}-1), i=1,2,3 \quad (16)$$

Note that while multiple operations 920 are shown here (one for each synthesized image), the same operation may be repeated sequentially with different parameters to generate the synthesized images.

Instead of using fixed scales for all scenes to generate different exposure levels, the scales identified by the operation 910 can be adapted based on scene statistics. Various considerations may drive image optimization. For example, dark regions of a scene may generally originate from one or more long-exposed images, and it may be desirable to increase the scale value if the overall scene brightness level is low so that dark region details are improved in the combined output. Bright/saturated regions may generally originate from one or more short-exposed images, and a cap may be placed on the scale value to avoid losing saturation details.

One way to analyze scene brightness may be to compute the histogram of luminance of an auto-exposed image. The auto-exposed image may be generated by passing the clipped input Bayer image (i.e., $I_1, I_2, \ldots, I_n$) through an ISP pipeline operation 930. Once the histogram is known, the electronic device 101 may obtain the histogram's cumulative density function (CDF), where the CDF may range from 0 to 1. The value at which the CDF is equal to 0.5 may provide the median brightness level (histMed). A scale value of the long exposed image may be modulated using this value, such as in the following manner:

$$S_m = (\text{th}_{base} - \min(\max(\text{histMed}, \text{th}_{min}), \text{th}_{max}))/\text{th}_{min} \quad (17)$$

$$S_3' = S_3 * S_m \quad (19)$$

In some embodiments, based on observations of input data, $\text{th}_{base}$ may be set to 100, $\text{th}_{min}$ may be set to 40, and $\text{th}_{max}$ may be set to 60. With these parameters, $S_m$ may range from 1 to 1.5. The value of $S_m$ may be used as a multiplier to update an initial scale value for long-exposed image ($S_3=4$). Similarly, histMax can be defined as a value at which the CDF is nearly at 1 (such as 0.999), and histMax can be used along with $S_m$ to update the scale value of the short exposed image, such as in the following manner:

$$S_1' = S_1 * \min\left(\max(S_m, 1), \frac{256}{\text{histMax}}\right) \quad (19)$$

where the initial value of $S_1$ is 0.0625.

After updating the scale values of the short- and long-exposed images, the electronic device 101 may update the scale of the medium exposed-image in order to position the medium exposure in the middle of the range defined by the short and long exposures. For example, geometric averaging may be used to determine the updated scale as follows:

$$S_2' = \sqrt{S_1' S_3'} \quad (20)$$

Figure 10:
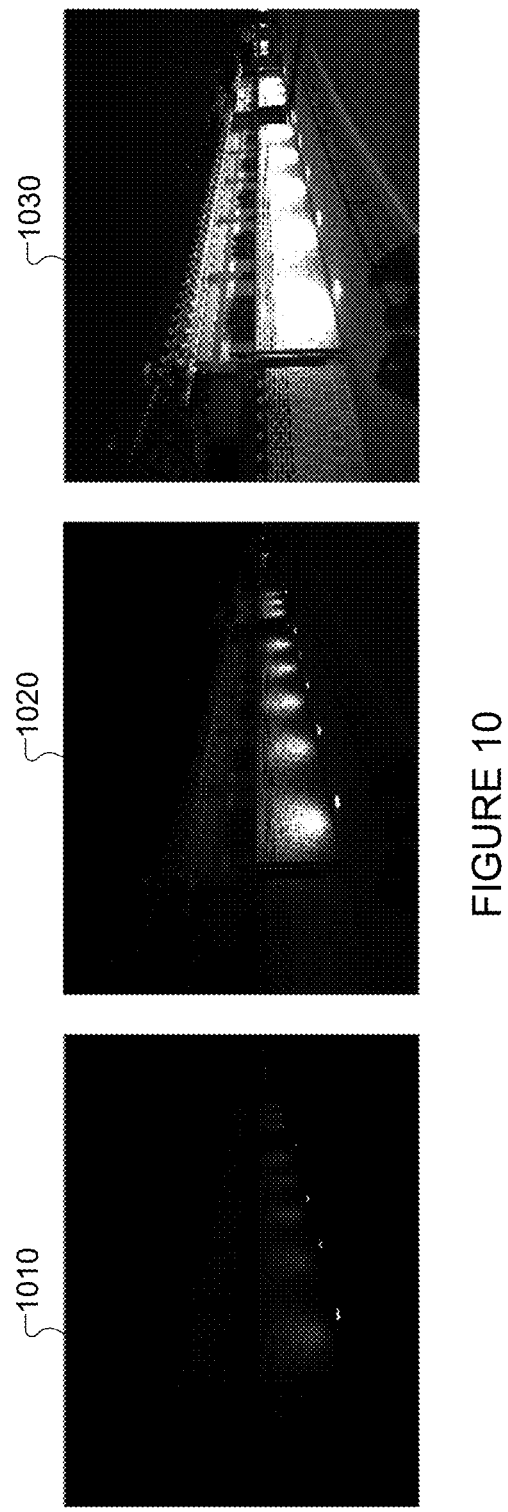
FIG. 10 illustrates example short, medium, and long exposed Bayer images in accordance with this disclosure.

FIG. 10 illustrates example short, medium, and long exposed Bayer images in accordance with this disclosure. More specifically, FIG. 10 illustrates an example short exposed Bayer image 1010, medium exposed Bayer image 1020, and long exposed Bayer image 1030. These images 1010, 1020, and 1030 may be generated by the operations 920 based on the input Bayer image $I_{16}$.

Figure 11:
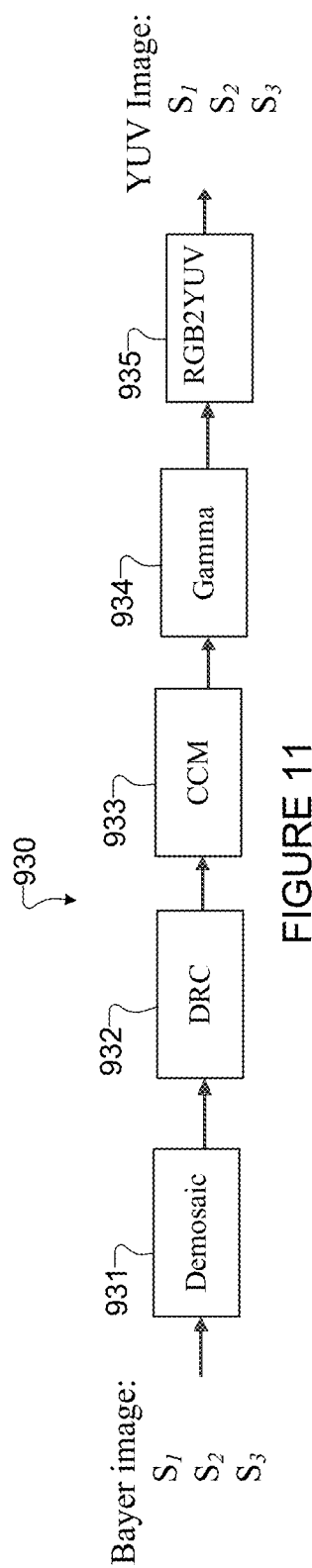
FIG. 11 illustrates an example image signal processing (ISP) pipeline operation of FIG. 9 in accordance with this disclosure.

The ISP pipeline operations 930 are performed to convert the clipped and scaled short, medium, and long Bayer images $S_1$, $S_2$, and $S_3$ into the YUV domain. Again, note that while multiple operations 930 are shown here (one for each synthesized image), the same operation may be repeated sequentially with different parameters to generate the converted images. FIG. 11 illustrates an example ISP pipeline operation 930 of FIG. 9 in accordance with this disclosure. As shown in FIG. 11, a demosaic operation 931 converts an image, such as from a 12-bit Bayer format to a 12-bit RGB format. As is known, each two-by-two cell in a Bayer image $S_1$, $S_2$, or $S_3$ contains two green samples, one blue sample, and one red sample. The output RGB image is half the size of the Bayer image, where the output RGB's green plane averages the green samples and where the red and blue planes are interpolated red and blue samples. Interpolation coefficients may be based on the distance between observed samples and the interpolated locations. In some cases, the following equations may be used to convert each Bayer image $S_1$, $S_2$, and $S_3$ into the RGB format:

$$G_p = \frac{1}{2} * G_1 + \frac{1}{2} * G_2 \quad (21)$$

$$R_p = \frac{3}{16} * R_1 + \frac{9}{16} * R_2 + \frac{1}{16} * R_3 + \frac{3}{16} * R_4 \quad (22)$$

$$R_p = \frac{3}{16} * R_1 + \frac{9}{16} * R_2 + \frac{1}{16} * R_3 + \frac{3}{16} * R_4 \quad (23)$$

In a dynamic range control (DRC) operation 932, a DRC lookup table having gain values may be applied to the input RGB images, such as by applying high gain on pixels of low intensity and low or no gain on pixels of high intensity. Here, gain values may be fetched from the lookup table based on the luminance values. In some cases, the following equations may be used to perform the DRC operation 932:

$$Y_p = 0.25 * R_p + 0.5 * G_p + 0.25 * B_p \quad (24)$$

$$g_p = DRC(Y_p) \quad (25)$$

The output of the DRC operation 932 may be the product of the input RGB image and its corresponding gain, such as $\tilde{R}_p = R_p * g_p$, $\tilde{B}_p = B_p * g_p$, $\tilde{G}_p = G_p * g_p$.

A color correction operation 933 applies a color correction matrix (CCM) to the output of the DRC operation 932. In some embodiments, the color correction operation 933 may be expressed as a 3×3 matrix that transforms camera RGB values into RGB values suitable for viewing on a display, which may be expressed as:

$$\begin{bmatrix} \hat{R}_p \\ \hat{G}_p \\ \hat{B}_p \end{bmatrix} = \begin{bmatrix} c_{11} & c_{12} & c_{13} \\ c_{21} & c_{22} & c_{23} \\ c_{31} & c_{32} & c_{33} \end{bmatrix} \begin{bmatrix} \tilde{R}_p \\ \tilde{G}_p \\ \tilde{B}_p \end{bmatrix} \quad (26)$$

A nonlinear Gamma correction operation 934 simulates how light and color are perceived by the human eye. For example, the Gamma correction operation 934 may compress input RGB images from 12-bits to 8-bits, such as by using an equation of:

$$RN_p = \left(\frac{\hat{R}_p}{2^{12}}\right)^\gamma * 2^8, GN_p = \left(\frac{\hat{G}_p}{2^{12}}\right)^\gamma * 2^8, BN_p = \left(\frac{\hat{B}_p}{2^{12}}\right)^\gamma * 2^8 \quad (27)$$

An RGB-to-YUV conversion operation 935 converts the 8-bit RGB images from the RGB domain to the YUV domain.

Outputs of the ISP pipeline operations 930 are provided to an image fusion and tone mapping operation 940, which fuses the YUV domain images and performs tone mapping. Note that Bayer domain tone mapping may easily clip the darker details of an image, which may lead to a dark halo around an intensity boundary. Here, the tone mapping occurs in the YUV domain in which gamma-corrected images are used, which can help avoid dark halos and related issues. Also, Bayer domain tone mapping may directly compress Bayer data using a global curve, and the result of the global curve may appear flat locally. Here, the tone mapping and pyramid blending occur in the YUV domain, which may result in local tone mapping and the preservation of local contrast. In addition, it is possible for multiple images to capture the same scene but result in vastly different tone-mapped outputs. Bayer domain tone mapping uses a histogram of the Bayer data to choose parameters, but the histogram distribution of the Bayer data may not be reliable if most of the Bayer data is very dark. Here, tone mapping techniques with consistent outputs is achievable because the medium-exposed image may control the entire brightness of the image, resulting in an image that is identical to or close to an auto-exposed image.

Figure 12:
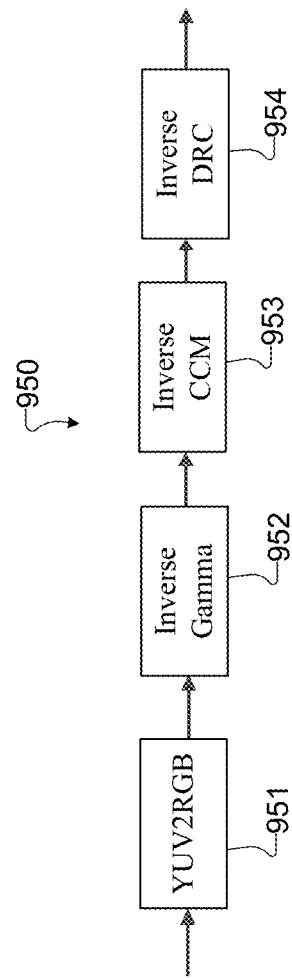
FIG. 12 illustrates an example inverse ISP pipeline operation of FIG. 9 in accordance with this disclosure.

The resulting fused image is provided to an inverse ISP pipeline operation 950, which generates a fused YUV image that covers the full dynamic range. FIG. 12 illustrates an example inverse ISP operation 950 of FIG. 9 in accordance with this disclosure. The inverse ISP pipeline operation 950 is the inverse process of the ISP pipeline operation 930. As shown in FIG. 12, a YUV-to-RGB conversion operation 951 converts the YUV domain image into an RGB domain image, such as 12-bit RGB data. An inverse Gamma operation 952, an inverse CCM operation 953, and an inverse DRC operation 954 apply inverses of the operations 934, 933, and 932, respectively.

A demosaic operation 960 generally operates to convert the original input image $I_{16}$ into RGB format ($R_o$, $G_o$, $B_o$), such as from a 16-bit Bayer format to a 12-bit RGB format. A gain map generation operation 970 generally operates to compute a gain map for each color plane (red, green, and blue). In some cases, this can be expressed as:

$$gain_R = \frac{R_f}{\max(R_0, \varepsilon)}, gain_G = \frac{G_f}{\max(G_0, \varepsilon)}, gain_B = \frac{B}{\max(B_0, \varepsilon)} \quad (28)$$

$$gain = 0.25 * gain_R + 0.5 * gain_G + 0.25 * gain_B$$

An apply gain map operation 980 applies the generated gain maps to the original input Bayer image to yield a final tone-mapped Bayer image. In some embodiments, the gain maps may be half the size of the input Bayer image 210, and the gain value applied to each pixel in the Bayer image may be an interpolated value that is based on the gain maps (although this need not be the case). Gain values may be generally low for brighter areas of the input image and generally high for darker areas of the input image.

Figure 13:
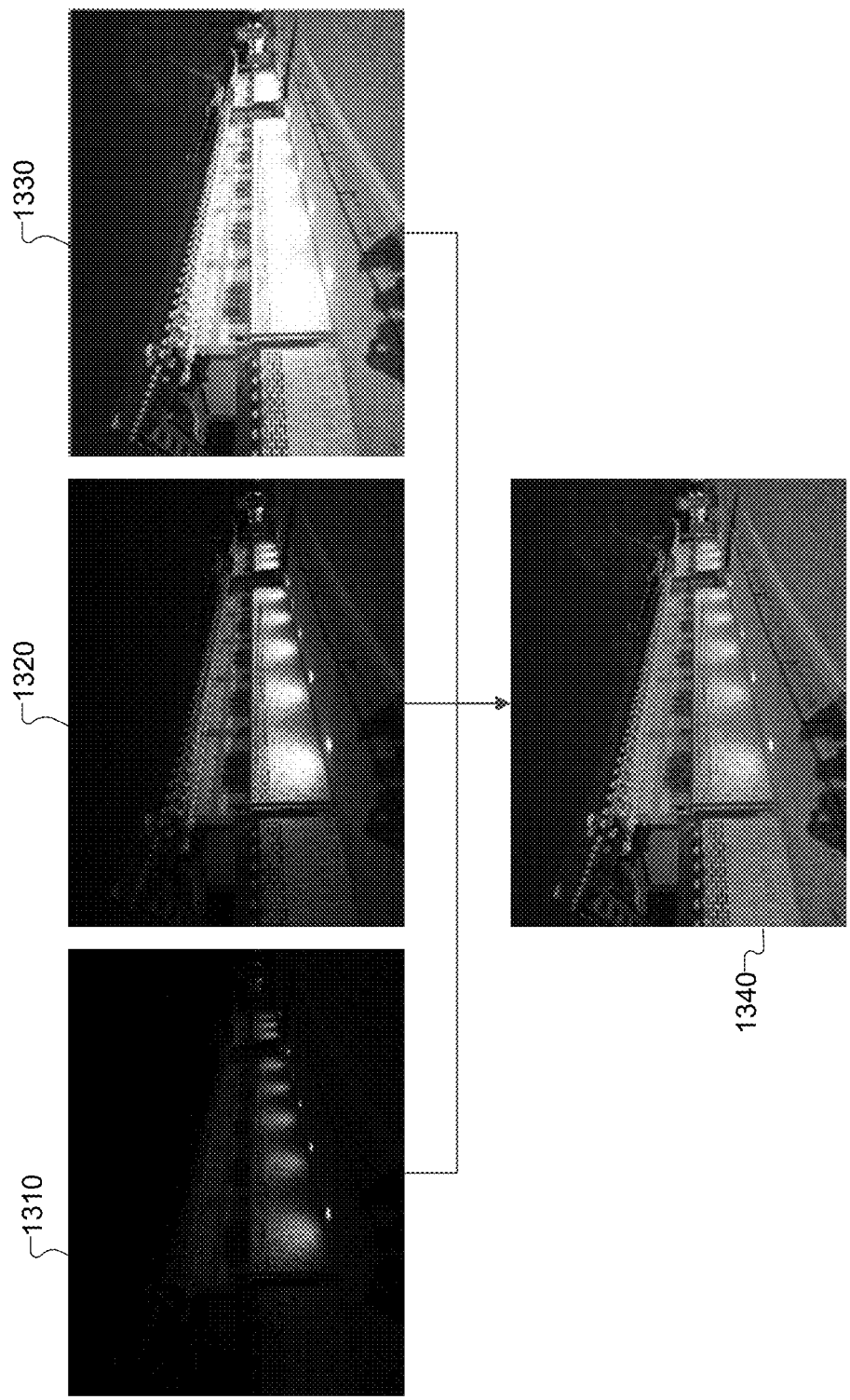
FIG. 13 illustrates an example output of an image fusion operation in accordance with this disclosure.

FIG. 13 illustrates an example output of an image fusion operation in accordance with this disclosure. More specifically, FIG. 13 illustrates an example short exposed YUV image 1310, a medium exposed YUV image 1320, a long exposed YUV image 1330, and the resulting fused YUV image 1340 that may be generated using the process 900. As can be seen here, the resulting fused YUV image 1340 covers the full dynamic range of the images 1310, 1320, and 1330.

Note that the functions and other operations described above with reference to FIGS. 9 through 13 can be implemented in an electronic device 101, 102, 104, server 106, or other device in any suitable manner. For example, in some embodiments, the operations described above can be implemented or supported using one or more software applications or other software instructions that are executed by at least one processor 120 of a device. In other embodiments, at least some of the operations described above can be implemented or supported using dedicated hardware components. In general, the operations described above can be performed using any suitable hardware or any suitable combination of hardware and software/firmware instructions.

Although FIGS. 9 through 13 illustrate one example of a YUV-based process 900 for dynamic range compression and related details, various changes may be made to FIGS. 9 through 13. For example, each operation in FIGS. 9, 11, and 12 may occur any number of times as needed or desired in order to process input images and generate output images.

Also, the images shown in FIGS. 10 and 13 are for illustration only and can vary widely based on the image data being processed.

Figure 14:
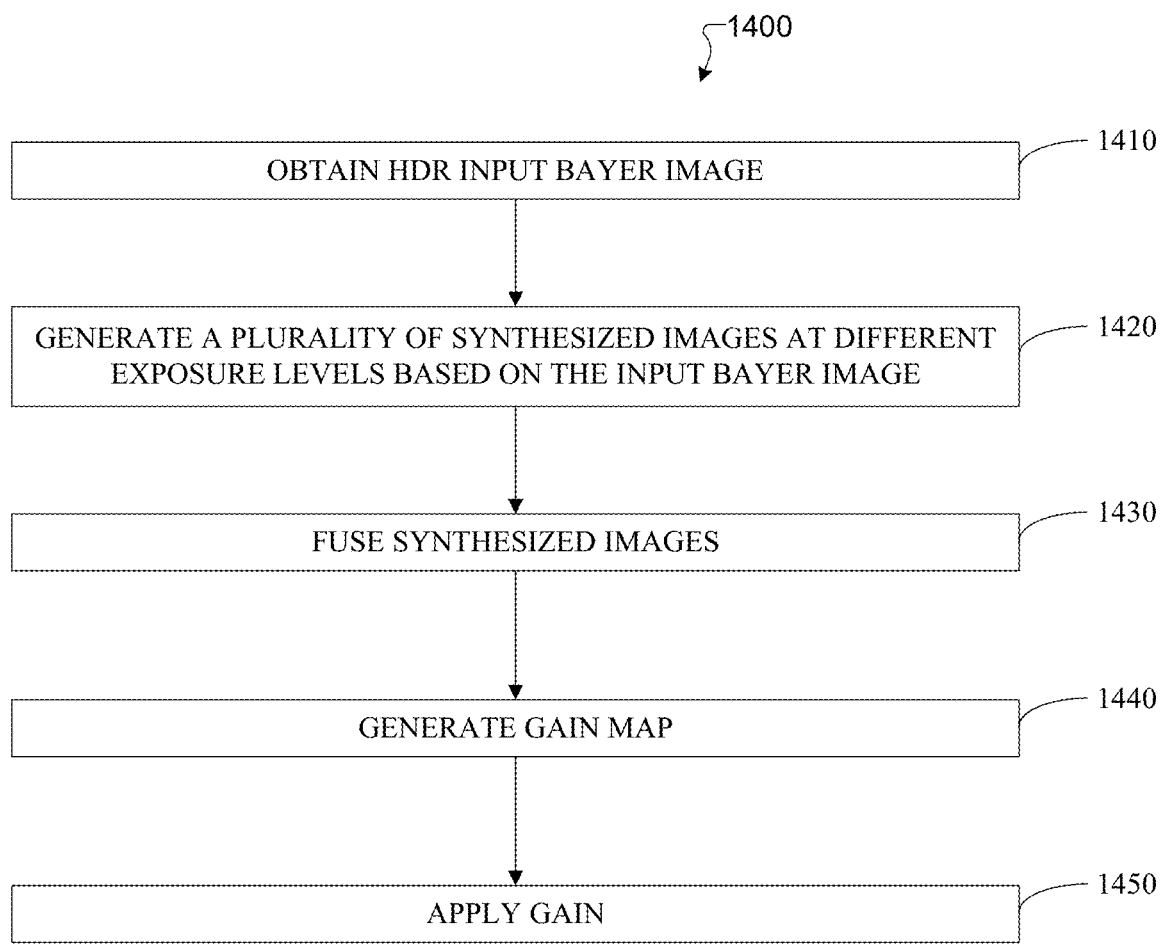
FIG. 14 illustrates an example method for dynamic range compression in accordance with this disclosure.

FIG. 14 illustrates an example method 1400 for dynamic range compression in accordance with this disclosure. For ease of explanation, the method 1400 is described as being implemented using the electronic device 101 shown in FIG. 1. However, the method 1400 could be implemented in any other suitable electronic device and in any suitable system, such as by the server 106.

As shown in FIG. 14, in step 1410, the electronic device 101 obtains an HDR input Bayer image. This may include, for example, the processor 120 of the electronic device 101 generating an HDR input Bayer image based on image frames captured using one or more sensors 180 of the electronic device. In step 1420, the electronic device 101 generates a plurality of synthesized images at different exposure levels based on the input Bayer image. This may include, for example, the processor 120 of the electronic device 101 generating two or more synthesized images at different exposure levels, such as short, medium, and long images. In step 1430, the electronic device 101 fuses the synthesized images to generate a fused or blended image. This may include, for example, the processor 120 of the electronic device 101 performing pyramid blending of the synthesized images.

In step 1440, the electronic device 101 generates a gain map based on the fused image. This may include, for example, the processor 120 of the electronic device 101 transforming the fused or blended image into a first RGB image, converting the input Bayer image into a second RGB image using a demosaic function to compute red, green, and blue plane gain maps, and generating the gain map based on the first RGB image and the red, green, and blue plane gain maps. In step 1450, the electronic device 101 applies gains to the input Bayer image. This may include, for example, the processor 120 of the electronic device 101 applying the gains as identified in the gain map to the input Bayer image.

Although FIG. 14 illustrates one example of a method 1500 for dynamic range compression, various changes may be made to FIG. 14. For example, while shown as a series of steps, various steps in FIG. 14 may overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
    obtaining, using at least one processor of an electronic device, a high dynamic range (HDR) input Bayer image;
    generating, using the at least one processor of the electronic device, a plurality of synthesized images at different exposure levels based on the input Bayer image;
    fusing, using the at least one processor of the electronic device, the synthesized images to generate a fused image;
    generating, using the at least one processor of the electronic device, a gain map based on the fused image; and
    applying, using the at least one processor of the electronic device, a gain based on the gain map to the input Bayer image;
    wherein generating the gain map comprises:
        transforming the fused image into a first RGB image; and
        converting the input Bayer image into a second RGB image using a demosaic function to compute red, green, and blue plane gain maps, the gain map based on the first RGB image and the red, green, and blue plane gain maps.

2. The method of claim 1, further comprising:
    converting the input Bayer image into a Luma domain image;
    wherein generating the plurality of synthesized images comprises:
        generating a first lookup table (LUT) based on a compression LUT and a contrast LUT, the compression LUT and the contrast LUT based on the input Bayer image;
        generating a second LUT based on the first LUT; and
        applying the first LUT and the second LUT to the Luma domain image.

3. The method of claim 1, wherein generating the plurality of synthesized images comprises generating YUV domain images based on the input Bayer image; and
    wherein generating the YUV domain images comprises:
        determining first, second, and third scales based on scene statistics;
        generating first, second, and third exposure images based on the first, second, and third scales, respectively; and
        clipping the first, second, and third exposure images into first, second, and third Bayer images, respectively.

4. The method of claim 3, wherein generating the YUV domain images further comprises:
    converting the first, second, and third Bayer images into third, fourth, and fifth RGB images, respectively;
    applying first, second, and third gain values to the third, fourth, and fifth RGB images, respectively, to generate first, second, and third adjusted images;
    performing first, second, and third color corrections based on the first, second, and third adjusted images, respectively, to generate first, second, and third color-corrected images;
    compressing the first, second, and third color-corrected images to generate first, second, and third compressed color-corrected images; and
    converting the first, second, and third compressed color-corrected images into first, second, and third YUV images, respectively.

5. The method of claim 3, wherein determining the first, second, and third scales comprises at least one of:
    increasing a scale value based on a low brightness level; and
    decreasing a scale value based on a high brightness level without exceeding a threshold.

6. The method of claim 1, further comprising:
    determining a pixel-wise compression level based on the gain map; and
    applying the pixel-wise compression level to the input Bayer image.

7. The method of claim 1, further comprising:
    outputting a displayable range image based on the applied gain, wherein the applied gain is determined as a weighted average of three color planes;
    wherein a gain value applied to each sample in the displayable range image comprises an interpolated value based on the gain map.

8. An electronic device comprising:
at least one processing device configured to:
    obtain a high dynamic range (HDR) input Bayer image;
    generate a plurality of synthesized images at different exposure levels based on the input Bayer image;
    fuse the synthesized images to generate a fused image;
    generate a gain map based on the fused image;
    apply a gain based on the gain map to the input Bayer image; and
    output a displayable range image based on the applied gain, wherein the applied gain is determined as a weighted average of three color planes;
wherein a gain value applied to each sample in the displayable range image comprises an interpolated value based on the gain map.

9. The electronic device of claim 8, wherein:
the at least one processing device is further configured to convert the input Bayer image into a Luma domain image; and
to generate the plurality of synthesized images, the at least one processing device is configured to:
    generate a first lookup table (LUT) based on a compression LUT and a contrast LUT, the compression LUT and the contrast LUT based on the input Bayer image;
    generate a second LUT based on the first LUT; and
    apply the first LUT and the second LUT to the Luma domain image.

10. The electronic device of claim 8, wherein:
to generate the plurality of synthesized images, the at least one processing device is configured to generate YUV domain images based on the input Bayer image; and
to generate the YUV domain images, the at least one processing device is configured to:
    determine first, second, and third scales based on scene statistics;
    generate first, second, and third exposure images based on the first, second, and third scales, respectively; and
    clip the first, second, and third exposure images into first, second, and third Bayer images, respectively.

11. The electronic device of claim 10, wherein, to generate the YUV domain images, the at least one processing device is further configured to:
    convert the first, second, and third Bayer images into first, second, and third RGB images, respectively;
    apply first, second, and third gain values to the first, second, and third RGB images, respectively, to generate first, second, and third adjusted images;
    perform first, second, and third color corrections based on the first, second, and third adjusted images, respectively, to generate first, second, and third color-corrected images;
    compress the first, second, and third color-corrected images to generate first, second, and third compressed color-corrected images; and
    convert the first, second, and third compressed color-corrected images into first, second, and third YUV images, respectively.

12. The electronic device of claim 10, wherein, to determine the first, second, and third scales, the at least one processing device is configured to at least one of:
    increase a scale value based on a low brightness level; and
    decrease a scale value based on a high brightness level without exceeding a threshold.

13. The electronic device of claim 8, wherein, to generate the gain map, the at least one processing device is configured to:
    transform the fused image into a first RGB image; and
    convert the input Bayer image into a second RGB image using a demosaic function to compute red, green, and blue plane gain maps; and
    wherein the gain map is based on the first RGB image and the red, green, and blue plane gain maps.

14. The electronic device of claim 8, wherein the at least one processing device is further configured to:
    determine a pixel-wise compression level based on the gain map; and
    apply the pixel-wise compression level to the input Bayer image.

15. A non-transitory machine-readable medium containing instructions that when executed cause at least one processor of an electronic device to:
    obtain a high dynamic range (HDR) input Bayer image;
    convert the input Bayer image into a Luma domain image;
    generate a plurality of synthesized images at different exposure levels based on the Luma domain image;
    fuse the synthesized images to generate a fused image;
    generate a gain map based on the fused image; and
    apply a gain based on the gain map to the input Bayer image;
    wherein the instructions that when executed cause the at least one processor to generate the plurality of synthesized images comprise instructions that when executed cause the at least one processor to:
        generate a first lookup table (LUT) based on a compression LUT and a contrast LUT, the compression LUT and the contrast LUT based on the input Bayer image;
        generate a second LUT based on the first LUT; and
        apply the first LUT and the second LUT to the Luma domain image.

16. A non-transitory machine-readable medium containing instructions that when executed cause at least one processor of an electronic device to:
    obtain a high dynamic range (HDR) input Bayer image;
    generate a plurality of synthesized images at different exposure levels based on the input Bayer image;
    fuse the synthesized images to generate a fused image;
    generate a gain map based on the fused image; and
    apply a gain based on the gain map to the input Bayer image;
    wherein the instructions that when executed cause the at least one processor to generate the plurality of synthesized images comprise instructions that when executed cause the at least one processor to generate YUV domain images based on the input Bayer image; and
    wherein the instructions that when executed cause the at least one processor to generate the YUV domain images comprise instructions that when executed cause the at least one processor to:
        determine first, second, and third scales based on scene statistics;
        generate first, second, and third exposure images based on the first, second, and third scales, respectively; and
        clip the first, second, and third exposure images into first, second, and third Bayer images, respectively.

17. The non-transitory machine-readable medium of claim 16, further containing instructions that when executed cause the at least one processor to convert the input Bayer image into a Luma domain image;

wherein the instructions that when executed cause the at least one processor to generate the plurality of synthesized images comprise instructions that when executed cause the at least one processor to:
  generate a first lookup table (LUT) based on a compression LUT and a contrast LUT, the compression LUT and the contrast LUT based on the input Bayer image;
  generate a second LUT based on the first LUT; and
  apply the first LUT and the second LUT to the Luma domain image.

18. The non-transitory machine-readable medium of claim 16, wherein the instructions that when executed cause the at least one processor to generate the YUV domain images further comprise instructions that when executed cause the at least one processor to:
  convert the first, second, and third Bayer images into first, second, and third RGB images, respectively;
  apply first, second, and third gain values to the first, second, and third RGB images, respectively, to generate first, second, and third adjusted images;
  perform first, second, and third color corrections based on the first, second, and third adjusted images, respectively, to generate first, second, and third color-corrected images;
  compress the first, second, and third color-corrected images to generate first, second, and third compressed color-corrected images; and
  convert the first, second, and third compressed color-corrected images into first, second, and third YUV images, respectively.

19. The non-transitory machine-readable medium of claim 16, wherein the instructions that when executed cause the at least one processor to determine the first, second, and third scales comprise instructions that when executed cause the at least one processor to at least one of:
  increase a scale value based on a low brightness level; and
  decrease a scale value based on a high brightness level without exceeding a threshold.

20. The non-transitory machine-readable medium of claim 15, further containing instructions that when executed cause the at least one processor to output a displayable range image based on the applied gain, wherein the applied gain is determined as a weighted average of three color planes;
  wherein a gain value applied to each sample in the displayable range image comprises an interpolated value based on the gain map.

* * * * *